(No Model.)
H. H. DOW.
GALVANIC BATTERY.
No. 480,384. Patented Aug. 9, 1892.
FIG. I
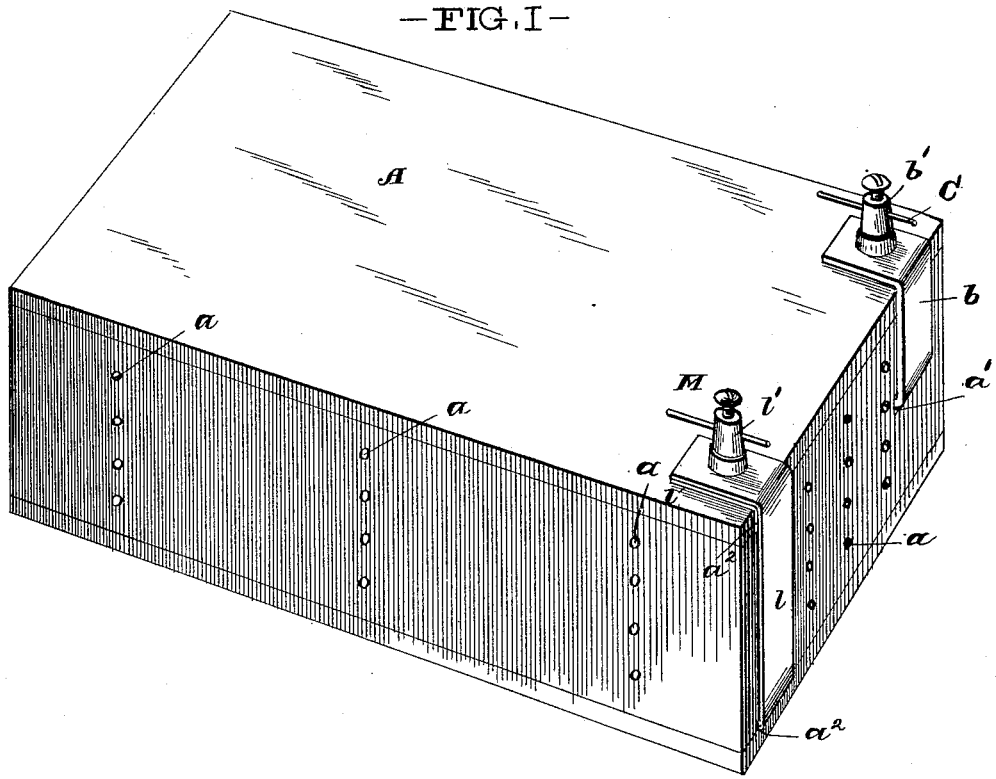
FIG. II
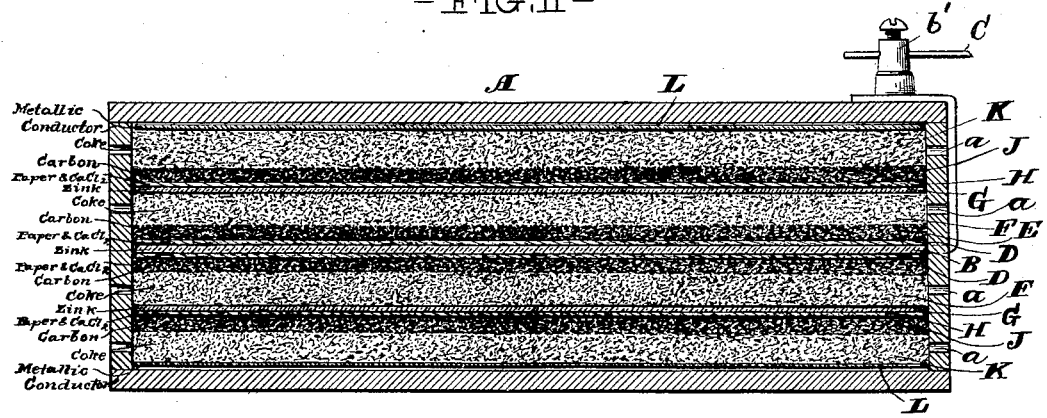
WITNESSES:
J. C. Turner
Wm H. Leclerc
INVENTOR.
BY H. H. Dow
Hall and Fay
ATTORNEYS.

UNITED STATES PATENT OFFICE.

HERBERT H. DOW, OF MIDLAND, MICHIGAN, ASSIGNOR OF TWO-THIRDS TO ALBERT H. SMITH AND JOHN C. HALE, OF CLEVELAND, OHIO.

GALVANIC BATTERY.

SPECIFICATION forming part of Letters Patent No. 480,384, dated August 9, 1892.

Application filed April 4, 1892. Serial No. 427,589. (No model.)

*To all whom it may concern:*

Be it known that I, HERBERT H. DOW, a citizen of the United States, and a resident of Midland, county of Midland, and State of Michigan, have invented certain new and useful Improvements in Electro-Galvanic Batteries, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents a perspective view of my improved electro-galvanic battery, and Fig. II a section of the same.

In the drawings the letter A indicates a box, of non-conducting material, either naturally porous or made so, such as wood, and preferably formed with holes $a$ in its sides, so as to more completely admit atmospheric air to the contents of the box. The elements of the battery are arranged in layers in this box, one above the other, and in the construction of the battery said layers are built up in substantially the same order as set forth in the description. Said middle layer consists of a zinc plate B, preferably twice as thick or, at all events, thicker than the other zinc plates employed in the battery. Said zinc plate has a lip $b$ projecting from one edge, and said lip projects through a slot $a'$ in the side of the box and is secured to said box, carrying a suitable binding-post $b'$ for the attachment of the wire C of the negative pole.

Two sheets or layers D of blotting-paper or similar highly-bibulous material are placed against the opposite faces of the zinc plate, and said sheets are moistened or saturated with a concentrated solution of calcium chloride, ($CaCl_2$,) calcium bromide, ($CaBr_2$,) or other deliquescent salt.

A layer E of finely-pulverized carbon is placed against the bibulous sheets containing the electrolyte, and said layer is sufficiently bibulous to absorb a part of the electrolyte by capillary action in the interstices between the fine-carbon particles, so that the layer will become practically coherent and form a porous or absorbent element of the battery or pile.

A layer F of granular carbon—such as coke— is placed against each one of the carbon layers and another zinc plate G is placed against each of said granular layers. Bibulous paper sheets H, moistened or saturated with the electrolyte, are placed against the faces of the zinc plates, and layers J of finely-pulverized carbon are placed against the faces of said sheets, similar to the layers E. Layers K of granular coke are placed against said layers of carbon, and plates L, of zinc or other conducting material, are placed against said granular layers and are provided with lips $l$, which project through slots $a^2$ in the sides of the box and are united and secured to the box, said lips carrying a binding-post $l'$, to which a wire M of the positive pole may be secured.

Although I prefer to construct my battery with the number of elements described, it is evident that a greater number of pairs of zinc plates, bibulous sheets, carbon layers, and coke layers may be employed. The holes in the sides of the box preferably register with the layers of the granular coke, so as to admit of the free passage of atmospheric air into the battery to come in contact with the deliquescent electrolyte and keep the latter moist. The finished battery will become active when the circuit is closed, the electrolyte attacking the zinc and causing the current to pass from the central positive zinc element through the electrolyte in the bibulous paper to the negative layers of pulverized carbon, thence through the layers of coke to the bright sides of the zinc elements, thence through the electrolyte in the bibulous sheets to the negative layers of pulverized carbon, and thence through the layers of granular coke to the zinc plates forming the conductors for the positive pole. The elements of the battery are thus connected in series and the electromotive force of the battery is consequently comparatively high. The deliquescent salt, with a solution of which the bibulous sheets are satu ated, will be kept moist, and consequently active as an excitant or electrolyte, by the moisture absorbed from the atmospheric air admitted into the box through the sides of the same, and the dry granular coke layers will serve to freely admit the air to the salt and at the same time serve as a conductor for the current between the couples of the battery. The carbon elements will be thoroughly acted upon by the electrolyte, as the latter is absorbed by capillary action, caused by the finely-pulverized condition of the carbon. The battery is equally suitable for work upon open or closed circuits and is depolarized by the atmospheric air, which enters it, and supplies oxygen to oxidize the hydrogen which collects upon or in the negative carbon layers.

It is obvious from the construction of the battery, having no free liquid and being inclosed in a wooden box, that it may be used in all positions and upon moving supports as well as upon stationary supports, and that a number of batteries may be piled one on top of the other in compact masses without danger to or disturbance of the action of the batteries.

The layers of granular coke serve as conductors between the elements, and as hard coke exerts no capillary action the layers will also serve to separate the elements and prevent the electrolyte in the carbon of one couple acting upon the zinc of the adjoining couple, and thus set up counter-currents, which would destroy the action of the battery.

Other modes of applying the principle of my invention may be employed for the mode herein explained. Change may therefore be made as regards the mechanism herein set forth provided the principles of construction respectively recited in the following claims are employed.

I therefore particularly point out and distinctly claim as my invention—

1. In an electro-galvanic battery, the combination, with couples of zinc and bibulous carbon elements having a non-liquid electrolyte between them, of a layer of a granular conductor arranged between the zinc of one couple and the carbon of another couple, substantially as set forth.

2. In an electro-galvanic battery, the combination of a zinc element, a bibulous sheet moistened with the electrolyte, and a layer of finely-pulverized carbon, substantially as set forth.

3. In an electro-galvanic battery, the combination, with a positive and a negative element and an interposed sheet of bibulous substance moistened with a deliquescent salt, of a porous and non-conducting box inclosing said elements and sheet, substantially as set forth.

4. In an electro-galvanic battery, the combination of couples of zinc and carbon elements having a deliquescent electrolyte between them, layers of granular coke between said couples, and a porous and non-conducting box inclosing said couples, substantially as set forth.

5. In an electro-galvanic battery, the combination of couples of zinc and carbon elements having a deliquescent electrolyte between them, layers of granular coke between said couples, and a non-conducting box inclosing said couples and layers and having air-holes registering with said layers, substantially as set forth.

6. In an electro-galvanic battery, a central positive element, pairs of bibulous sheets containing the electrolyte, and pairs of negative elements arranged in opposite order at opposite sides of the central element, substantially as set forth.

7. In an electro-galvanic battery, couples having their elements facing in opposite directions and arranged in opposite order from a central positive element, and layers of a granular conducting material between said couples, substantially as set forth.

8. In an electro-galvanic battery, an inclosing-box of non-conducting material having openings for the admission of atmospheric air into its interior, a positive element arranged in the middle of the box and having a binding-post connection upon the exterior of the box, sheets of bibulous non-conducting material placed against the faces of said element and moistened with a solution of a deliquescent salt, negative elements of porous and bibulous material placed against said sheets, layers of granular conducting material placed against said negative elements, positive elements placed against said layers, sheets of bibulous non-conducting material placed against said positive elements and moistened with a solution of deliquescent salt, negative elements of porous and bibulous material placed against said sheets, layers of granular conducting material placed against said negative elements, and metallic conducting-sheets placed against said layers and having united binding-post connection upon the outside of the box, substantially as set forth.

9. In an electro-galvanic battery, the combination, with couples of zinc and bibulous carbon elements having between them a solid non-conducting substance moistened with a solution of a deliquescent salt, of a layer composed of a granular conductor which is arranged between the zinc of one couple and the carbon of another, substantially as set forth.

In testimony that I claim the foregoing to be my invention I have hereunto set my hand this 1st day of April, A. D. 1892.

HERBERT H. DOW.

Witnesses:
WM. SECHER,
D. D. WOOD.